（12）United States Patent
Pintz et al.

(10) Patent No.: US 6,384,569 B1
(45) Date of Patent: May 7, 2002

(54) LAYOUT AND PROCEDURE OF CHARGING OF BATTERIES

(76) Inventors: György Pintz, Logodi u. 57, H-1012 Budapest; György Zsombok, Stefánia út 47, H-1143 Budapest; Kinga Paczolay, Mészáros u. 10, H-1016 Budapest, all of (HU)

( * ) Notice: Subject to any disclaimer, the term of this patent is extended or adjusted under 35 U.S.C. 154(b) by 0 days.

(21) Appl. No.: 09/308,277
(22) PCT Filed: Dec. 28, 1996
(86) PCT No.: PCT/HU96/00085
§ 371 Date: May 11, 2000
§ 102(e) Date: May 11, 2000
(87) PCT Pub. No.: WO98/16962
PCT Pub. Date: Apr. 23, 1998

(30) Foreign Application Priority Data

Oct. 16, 1996 (HU) .............................................. 9602862

(51) Int. Cl.⁷ .............................. H02J 7/00; H01M 8/04
(52) U.S. Cl. ......................................... 320/101; 429/17
(58) Field of Search ........................... 320/101; 429/13, 429/14, 15, 17, 80

(56) References Cited

U.S. PATENT DOCUMENTS

| | | | | |
|---|---|---|---|---|
| 4,127,701 A | * | 11/1978 | Symons et al. | 429/19 |
| 4,448,858 A | * | 5/1984 | Graf et al. | 429/49 |
| 5,135,820 A | * | 8/1992 | Jones | 429/49 |
| 5,196,275 A | * | 3/1993 | Goldman et al. | 429/27 |
| 5,304,430 A | * | 4/1994 | Ludwig | 429/17 |
| 5,558,947 A | * | 9/1996 | Robinson | 429/13 |

* cited by examiner

Primary Examiner—Gregory Toatley
(74) Attorney, Agent, or Firm—Burns, Doane, Swecker & Mathis, L.L.P.

(57) ABSTRACT

A charging layout for one or more batteries of an electric vehicle includes one or more batteries having an inlet conduit and an outlet conduit, wherein the inlet conduit is connected to a distribution unit, and the outlet conduit is connected to a draining unit, a collector tank unit of a filling station connected to the draining unit, an active tank of a filling station connected to the distribution unit, wherein the active tank comprises a primary reservoir for electrode suspension and a primary electrolyte reservoir for electrolyte, and a fixing unit connected to the one or more batteries for fixation and removal of the electrode suspension from the one or more batteries.

13 Claims, 1 Drawing Sheet

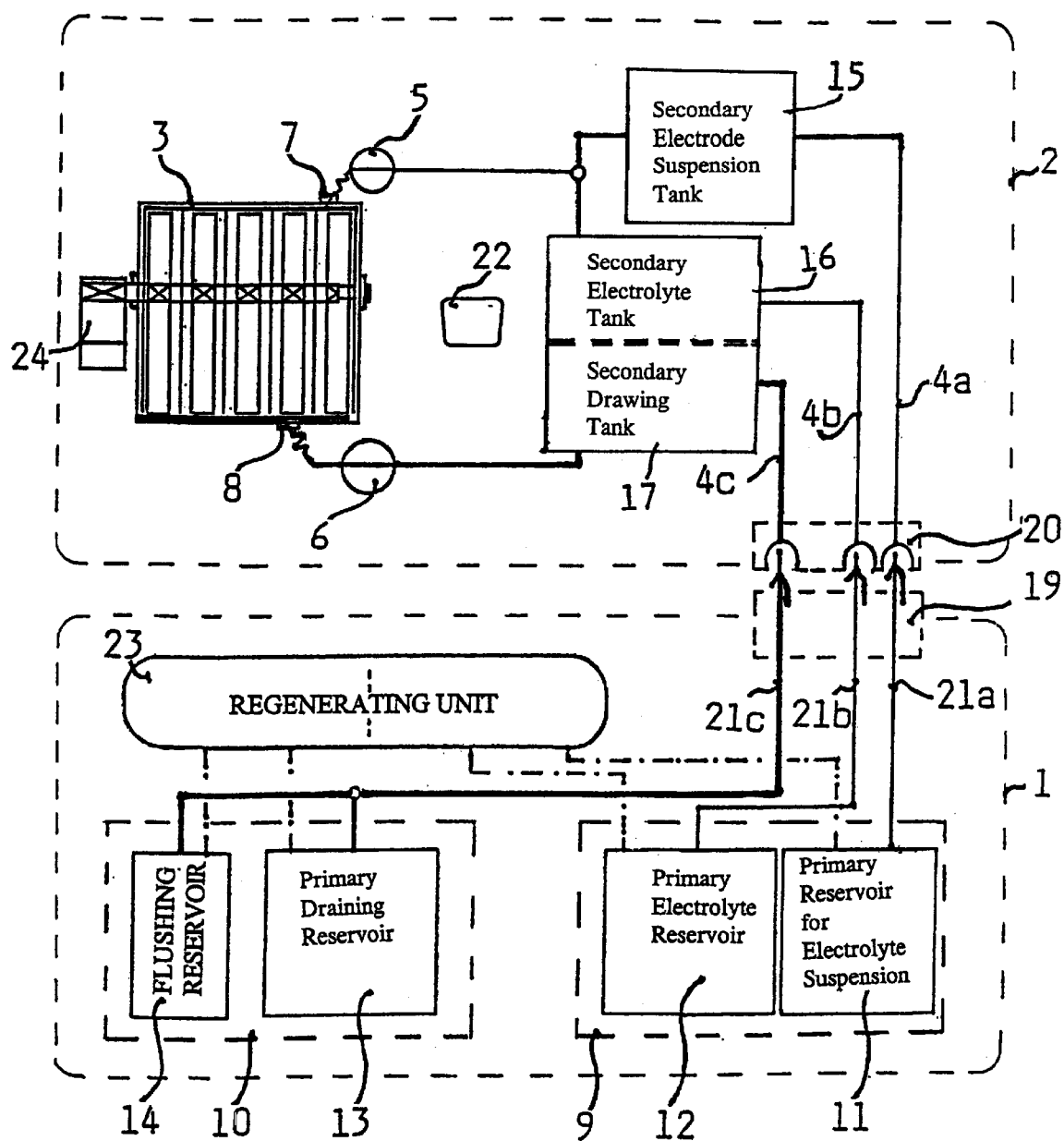

LAYOUT AND PROCEDURE OF CHARGING OF BATTERIES

FIELD OF THE INVENTION

This invention relates to the charging layout of batteries, first of all for electric vehicles, involving a filling station, batteries, one or more inlet conduits and one or more outlet conduits, where the inlet conduits are joined to a distribution unit and the outlet conduits are connected to a draining unit, and with the draining unit connected with the collector tank unit of the filling station. The invention also relates to a procedure for charging batteries, first of all for electric vehicles, in the course of which the liquid-like used parts of the batteries are removed from the vehicle and regenerated electrolyte is fed into the batteries.

BACKGROUND OF THE INVENTION

Numerous demands have to be fulfilled by batteries in electric vehicles. These are reviewed together with the different types batteries in books, as they follow: Chemical Electric Energy Sources and Their Applications (Hungarian, Müszaki Könyvkiadó, Budapest, 1978); Battery Reference Book (London, 1990); History of the Electric Automobile (Soc. Automotive Eng., USA, 1994). The charge of most modem batteries is even today a time consumption process. This gives rise to difficulties against the development of electric vehicles.

The up to now aims of developments were the higher energy density and economy of such power sources. The following patents show batteries with higher energy density: No. WO 94-15372 for zinc-bromine, No. EP 600.718 and EP 458.395 for zinc-air, the No. EP 391.443 and WO 90-04268 for aluminium-air batteries. According to WO 92-15120, for increasing of capacity a fixed accumulator layout is also known, where during its operation the electrolytes were continuously pumped out and after its refreshing are continuously fed back. But even a battery of higher energy density does not mean any alternative to the internal combustion engines of lower efficiency, because of the great difference in their refuelling times.

U.S. Pat. No. 4,448,858 shows a battery which can be regenerated in a chemical way. Chemical regeneration of the battery is carried out by adding formaldehyde. A drawback of this solution is that practically it can be applied only with an iron-all battery. A further disadvantage is that the regeneration of the battery requires, beyond the components of the battery, the use of a further substance which at that is poisonous.

U.S. Pat. No. 5,304,430 presents a fuel cell using hydrogen gas, strong acid and base electrolytes. The drawback of this solution is that its application in a motor vehicle is extremely dangerous. In case of an accident contacting the strong acid with a base may cause an explosion. U.S. Pat. No. 5,558,947 presents a metal-air type battery. For the operation of the battery, a diverter and continuous circulation of the electrolyte are necessary. The disadvantage of this solution is that the flow resistance of the diverter and the continuous circulation decrease the yield of the battery.

U.S. Pat. No. 4,127,701 presents a battery in which the electrolyte continuously circulates during operation between the battery and a reservoir. The electric car has to take with itself both the battery and the reservoir. The substance necessary for operating the cathode of the battery is dissolved. This solubility is, however, limited. Therefore the reservoir is needed to increase the quantity of the electrolyte and thus to raise the capacity of the battery. This solution has several drawbacks. The use of chlorine gas involves the risk of accident. Charging of the battery requires three materials, including the regeneration of the halogen cathode. The regeneration itself is a long lasting process because the material of the anode is a solid metal and so its regeneration can be carried out only by mechanical change or by an equally long lasting electric charging.

WO 92/02964 presents a battery which can be used also in electric vehicles. To regenerate the battery, its used up components are removed and replaced by fresh ones. A disadvantage of the solution is that removal of the used up components and the filling in of the fresh ones is done in different places. Thus, after the removal of the exhausted battery, the vehicle has to be transferred by a complicated and expensive device to the filling place. This considerably increases the costs of building a filling station.

A further disadvantage is that the regeneration of the components of the battery is effectuated by means of electric energy which is not the best solution for metal-air batteries. Particularly disadvantageous is that the feeding in of the anode material and the electrolyte is carried out in one operational step, as thus the electrolyte remains saturated with anode particles. The anode particles suspended in the electrolyte generate so called parasitic current which decreases the efficiency of the battery. Another disadvantage is that the anodes are not fixed on the surface of framework. The lack of fixing the anode particles considerably decreases the capacity of the battery.

SUMMARY OF THE INVENTION

Unlike the solutions described above, in the case of our patent the substance of the anode is not mixed up with the working electrolyte of the battery. Until being fixed on its supporting surface, the anode material behaves as a non-Newtonian suspension, but after its fixation on the anode surface it can be regarded as solid material. Unlike the known solutions, in the case of our invention there is no need to transfer the vehicle between the draining and filling. After filling the electrolyte is a practically pure Newtonian liquid free of metallic particles. A possible flushing after the filling of the electrodes may further increase the pureness of the electrolyte.

The aim of the invention is the elimination of the disadvantages of the solutions known up to now and providing a possibility, where the charging of a battery will not need essentially more time than that of the refuelling of a classic engine.

The basic idea of the invention is the recognition as follows: performing the charging of the appropriate parts of the batteries by liquid-like materials, i.e. electrode suspensions, instead of electric charge so that a better solution may be achieved.

According to the aim considered above, the charging layout of batteries or fuel cells, first of all for electric vehicles, involves a filling station, batteries, one or more inlet conduits and one or more outlet conduits, where the inlet conduits are joined to a distribution unit and the outlet conduits are connected to a draining unit. The draining unit for distributing electrode suspension and/or electrolyte uniformly between the battery electrodes is connected with the collector tank unit of the filling station, consists of a distribution unit in connection with an active tank unit of the filling station containing electrode suspension and electrolyte and a primary reservoir for electrode suspension and a primary electrolyte reservoir involved into the active tank unit, and a fixing unit connected to the batteries, and it is able to help fixation and removing of the electrode suspension in and out of the batteries.

The layout according to the invention is characterised by a primary draining reservoir and possibly a flushing reservoir included into a collector tank unit. Variations of the invention are as follows: between the distributing unit and the active tank unit a secondary electrode suspension tank and a secondary electrolyte tank are inserted belonging to the vehicle, and similarly, between the draining unit and the collector tank unit a secondary draining tank is inserted.

The battery conduits suitable for transporting liquids are connected to the joining unit of the vehicle and the tubes of the filling station are advisably connected to a filling device fitted to the joining unit. The volumes of the secondary electrolyte tank and that of the secondary draining tank may be unified through a separating element, but the single volumes may change against each other. Between the distribution unit and draining unit there is a connection formed by an internal driving unit suitable for driving of the secondary charging of batteries. Another connection exists between the active tank unit and the collector tank unit through a regenerating unit.

The procedure for charging batteries or fuel cells, first of all for electric vehicles, according to our invention, in the course of which the liquid- like used parts of the batteries are being removed from the vehicle and electrolyte is fed into the batteries, can be characterised by the feeding of an electrode suspension into the batteries prior to feeding the electrolyte, and by fixing the electrode suspension.

The procedure according to our invention may be characterized as follows: during the charging process the filling device of a filling station will be fitted into the joining unit of the vehicle, the used components of the batteries will be transported into the collector tank unit of the filling station and from an active tank unit of the filling station the electrode suspension will be transported into the batteries and will be distributed uniformly between the electrodes, after its fixation eventually a washing of the batteries may occur, and then the batteries will be filled up with electrolyte and the filling device will be removed from the joining unit.

The procedure according to our invention may be also characterized in the following way: from the batteries at least one part of the used components of the batteries will be transported into a secondary draining tank of the vehicle, and then or simultaneously from a secondary electrode suspension tank and/or from the secondary electrolyte tank of the vehicle the electrode suspension and the electrolyte will be fed into the batteries.

The charging of the batteries according to this invention has more advantages. The most important among them is that the direct renewing of the batteries being able to drive a vehicle does not occur by direct feeding in of electric charges, but by replacing of some parts of the batteries by their pumping out and in, i.e. their anodes and electrolytes in liquid-like form. The pumped out parts may be regenerated in a central place, for example at the filling station itself The electric vehicles stay at the station only for the time needed for changing of its liquids. The refuelled car can continue on its way in a few minutes.

The change of components of battery may only be even partial and this type of refuelling may also be of some advantages, i.e. an electric vehicle may be even half-refuelled. This provides a possibility for a refuelling between two filling stations, so called "on the road refuelling". To provide this possibility the batteries must be completed by other tanks, from them a refuelling may occur.

The charging process according the invention may have advantages concerning environmental aspects, as well. An electric vehicle equipped according to the invention has no pollution only due to its energy producing process,. Its emission of harmful substances is equal to zero.

BRIEF DESCRIPTION OF THE DRAWING FIGURES

Further on we present a more detailed description of the varieties of invention on the base of the drawing figure in which FIG. 1 illustrates the layout for recharging batteries of electric vehicles.

DETAILED DESCRIPTION OF THE INVENTION

The FIG. 1 shows the layout of recharging batteries 3 of an electric vehicle 2 standing at the filling station 1. During recharging the filling device 19 of the filling station 1 will be joined into the joining unit 20 of the electric vehicle 2. The distribution unit 5 in the vehicle joins to the inlet conduits 7 of batteries 3, while the draining unit 6 in the vehicle joins to its draining conduits 8. The electrode suspension, the electrolyte and the used (depleted) components of the batteries will be transported to the joining unit 20 by the conduits 4a, 4b and 4c, respectively. The batteries 3 are completed by a fixing unit 24 to fix on and remove electrode suspension.

The collector tank unit 10 of the filling station 1 involves the primary draining reservoir 13, the flushing reservoir 14, but the active tank unit 9 involves the primary electrolyte reservoir 12 and the primary reservoir for electrode suspension 11. The regenerating unit 23 for producing active electrode suspension and electrolyte, the tubes 21a, 21b, 21c are also located at the filling station 1.

Charging the batteries 3 of the vehicle 2 may occur outside the filling station 1 using the secondary electrode suspension tank 15, the secondary electrolyte tank 16 and the secondary draining tank 17. The united secondary electrolyte tank 16 and secondary draining tank 17 is shared by a membrane or piston-like separating element 18. The driving unit 22 is connected to the distribution unit 5 and the draining unit 6.

Batteries 3 in this invention mean devices being able to transform chemical energy into electric one, for example fuel cells, electrochemical generators, secondary batteries. The batteries 3 are advisably metal-air type ones. An aluminium-air battery may be in this case very advantageous. The secondary electrode suspension tank 15 and the secondary electrolyte tank 16 may be united into one housing. The conduits 4a and 4b may also be united, in case of periodical working even the conduit 4c may be united into one, with them. Similarly the tubes 21a, 21b and 21c may also be united into one. According to the concept applied the joining unit 20 may have one or more opening and similarly the filling device 19 may also have the same number of filling-draining conduits.

The charging process can be made known as follows. One of the simplest way is feeding electrode suspension and regenerated electrolyte into the batteries 3, and the used components of batteries will be simultaneously removed from the vehicle 2. Regenerated electrolyte means in these cases fresh made electrolyte, as well.

In another example for procedures the batteries 3 are metal-air type ones. At the filling station 1 the active tank unit 9 stores the anode suspension and the electrolyte in the primary reservoir for electrode suspension 11 and in the primary electrolyte reservoir 12, respectively. The used parts of batteries 3 will be transported into the primary draining reservoir 13 of the collector tank unit 10. The fixing of fresh anode and removing of the (partially) depleted one may be accelerated by using an ultrasonic device in the fixing unit 24. Following or simultaneously the anode suspension may be fed into the inlet conduit 7 through the distribution unit 5. By the fixing unit the electrode plates of batteries will be remove from each other and turned into the position where the anode suspension will be fixed better and faster. After these operations they will be turned back into their original positions. If the anode suspension is made of a ferromagnetic materiel the fixing unit may involve a magnetic head, ag well, to utilise advantageously this property in its fixing process.

The excess of anode suspension will be washed out of the batteries by electrolyte and the flushing liquid will be fed through the draining conduit 8 into the flushing reservoir 14. Simultaneously further feeding of electrolyte will occur into the batteries from the primary electrolyte reservoir 12. After filling them up ready the connection between the joining unit 20 and the filling device 19 will be broken. In case of batteries using rechargeable cathode, as well, the process is the same to that of anodes.

At the filling station 1 the contents of the flushing reservoir 14 will be separated into anode suspension and electrolyte, and the components will be fed back into the active tank unit 9. The depleted components in the primary draining reservoir 13 may be regenerated using electric charges, and afterwards they also may be fed back into the active tank unit 9.

During the charging the anode suspension gets through the primary reservoir for electrode suspension 11 and the joining unit 20 into the cells of batteries 3. The fixing unit 24 removes the electrode plates of the batteries 3 from each other, and either the batteries 3 themselves or only their plates inside will be turned into appropriate position to help the sedimentation and fixation of anode suspension. Afterwards the fixing unit 24 will turn back everything into the original position. If the anode suspension is made of a ferromagnetic materiel the fixing unit 24 may have a possible part, as well, to utilize advantageously this property in this fixing process.

There is also a possibility for at least the partially renewing of batteries independent in time and space from the filling station 1. In this case the first and the third phases of the process will be performed at the filling station 1, but the second one will be done independently from it. The first step occurred while the secondary electrolyte tank 16 and the secondary electrode suspension tank 15 of vehicle 2 was filled up during one of our earlier charges from the active tank unit 9 of the filling station 1. In the second phase, the batteries 3 need again charge: in this case the used components will be transmitted into the secondary draining tank 17, the electrode suspension and the electrolyte will be fed into the batteries 3 from the secondary electrode suspension tank 15 and the secondary electrolyte tank 16, respectively. The process is driven by the driving unit 22. After finishing this phase the vehicle 2 can continue on its way. The third phase may occur at a filling station 1 again: the content of the secondary draining tank 17 will be transmitted into the collector tank unit 10 of the filling station 1. Because of the space shortening the secondary electrolyte tank 16 and the secondary draining tank 17 is united, only their total volume is determined. The united tank is shared into two parts by a separating element 18, working according to membrane or piston principle. Being the secondary electrolyte tank 16 full the secondary draining tank 17 is empty, and vice versa.

The charging procedure and layout according to the invention may be used first of all for electric vehicles and it makes possible their working to be similar to the internal combustion engines considering as well as the operation radius and "refuelling", which occurs without direct using of electric charges.

What is claimed is:

1. A charging layout for one or more batteries of an electric vehicle comprising:

one or more batteries having an inlet conduit and an outlet conduit, wherein the inlet conduit is connected to a distribution unit, and the outlet conduit is connected to a draining unit;

a collector tank unit of a filling station connected to the draining unit;

an active tank of a filling station connected to the distribution unit, wherein the active tank comprises a primary reservoir for electrode suspension and a primary electrolyte reservoir for electrolyte; and a fixing unit connected to the one or more batteries for fixation and removal of the electrode suspension from the one or more batteries.

2. A layout according to claim 1, wherein the collector tank unit comprises a primary draining reservoir and, optionally, a flushing reservoir.

3. A layout according to claim 1, further comprising a secondary reservoir for electrode suspension and a secondary electrolyte reservoir for electrolyte between the distribution unit and the active tank unit, and a secondary draining unit between the draining unit and the collector tank unit.

4. A layout according to claim 3, wherein the secondary electrolyte reservoir and the secondary draining unit are separated by a movable separating element such that the secondary electrolyte reservoir and the secondary draining unit occupy the same space, and wherein a volume of the secondary electrolyte reservoir and a volume of the secondary draining unit change independently.

5. A layout according to claim 1, further comprising a joining unit connected by battery conduits to both the distribution unit and the draining unit, wherein the joining unit is further connected to a filling device connected to both the active tank and the collector tank by tubes.

6. A layout according to claim 1, further comprising an internal driving unit connecting the distribution unit and draining unit, wherein the internal driving unit is responsible for the secondary charging of one or more batteries.

7. A layout according to claim 1, further comprising a regenerating unit connecting the active tank unit and the collector tank unit.

8. A procedure for charging a battery of an electric vehicle, comprising:

removing a liquid-like used part from the battery;

adding an electrode suspension to the battery;

fixing the electrode suspension; and adding electrolyte to the battery.

9. The procedure of claim 8, further comprising:

fitting a fill device of a filling station to a joining unit of the battery;

removing the liquid-like used part of the battery through the joining unit and fill device and collecting the liquid-like used part into a collector tank unit of the filling station, wherein the connector tank unit is connected to the fill device;

adding an electrode suspension from an active tank of the filling station to the battery through the fill device and joining unit;

distributing the added electrode suspension uniformly between electrodes of the battery;

fixing the electrode suspension;

washing the battery;

adding electrolyte to the battery through the fill device and joining unit; and removing the fill device from the joining unit of the battery.

10. A procedure according to claim 8, wherein the liquid-like used part of the battery is removed to a secondary draining tank and the electrode suspension is added from a secondary electrode suspension tank.

11. A procedure according to claim 8, wherein the liquid-like used part of the battery is removed to a secondary draining tank and the electrolyte is added from a secondary electrolyte tank.

12. A procedure according to claim 8, wherein the electrolyte is regenerated electrolyte.

13. A procedure according to claim 8, wherein the liquid-like used part is removed simultaneous to adding the electrode suspension to the battery.

* * * * *